US012330431B2

(12) United States Patent
Preliasco et al.

(10) Patent No.: US 12,330,431 B2
(45) Date of Patent: Jun. 17, 2025

(54) MEDIA PROCESSING DEVICE DRIVE MECHANISMS FOR SELECTABLE MEDIA TYPES

(71) Applicant: ZEBRA TECHNOLOGIES CORPORATION, Lincolnshire, IL (US)

(72) Inventors: Richard J. Preliasco, North Kingstown, RI (US); David F. Beck, Exeter, RI (US)

(73) Assignee: Zebra Technologies Corporation, Lincolnshire, IL (US)

( * ) Notice: Subject to any disclaimer, the term of this patent is extended or adjusted under 35 U.S.C. 154(b) by 378 days.

(21) Appl. No.: 17/895,802

(22) Filed: Aug. 25, 2022

(65) Prior Publication Data

US 2024/0067492 A1 Feb. 29, 2024

(51) Int. Cl.

| | |
|---|---|
| ***B41J 11/00*** | (2006.01) |
| ***B41J 3/407*** | (2006.01) |
| ***B41J 11/04*** | (2006.01) |
| ***B41J 11/14*** | (2006.01) |
| ***B41J 11/48*** | (2006.01) |
| ***B41J 15/18*** | (2006.01) |

(Continued)

(52) U.S. Cl.

CPC ............. *B41J 23/02* (2013.01); *B41J 3/4075* (2013.01); *B41J 11/003* (2013.01); *B41J 11/009* (2013.01); *B41J 11/04* (2013.01); *B41J 11/14* (2013.01); *B41J 11/485* (2013.01); *B41J 15/18* (2013.01); *B41J 29/38* (2013.01); *B41J 15/22* (2013.01); *B65H 75/30* (2013.01)

(58) Field of Classification Search

CPC ........ B41J 23/02; B41J 3/4075; B41J 11/003; B41J 11/04; B41J 11/14; B41J 11/485; B41J 15/18; B41J 29/38; B41J 11/009; B41J 15/22; B65H 75/30

See application file for complete search history.

(56) References Cited

U.S. PATENT DOCUMENTS

| | | | | |
|---|---|---|---|---|
| 6,039,481 A | 3/2000 | Ham | | |
| 6,398,360 B1 * | 6/2002 | Brewington | B41J 11/04 | 347/105 |
| 2008/0226376 A1 * | 9/2008 | Monteith | B41J 11/0095 | 400/613 |

FOREIGN PATENT DOCUMENTS

| | | | |
|---|---|---|---|
| GB | 191421275 A | 7/1915 | |
| JP | H04189165 A * | 7/1992 | B41J 11/48 |
| JP | H04216972 A * | 8/1992 | B41J 11/51 |

OTHER PUBLICATIONS

International Search and Written Opinion for International Application No. PCT/US2023/28223 mailed on Oct. 27, 2023.

* cited by examiner

*Primary Examiner* — Yaovi M Ameh

(57) ABSTRACT

A media processing device includes: a print head extending across a media path, and configured to apply indicia to media; a platen roller assembly adjacent to the print head, the print head configured to draw the media from a media supply along the media path travelling between the print head and the platen roller assembly, the platen roller assembly including: (i) a first platen roller extending across a first portion of a width of the media path, and (ii) a second platen roller coaxial with the first platen roller, and extending across a second portion of the width of the media path; a drive assembly coupled with the first and second platen rollers, the drive assembly configured to selectively drive rotation of either or both of the first and second platen rollers.

23 Claims, 8 Drawing Sheets

(51) Int. Cl.

| | |
|---|---|
| ***B41J 23/02*** | (2006.01) |
| ***B41J 29/38*** | (2006.01) |
| *B41J 15/22* | (2006.01) |
| *B65H 75/30* | (2006.01) |

MEDIA PROCESSING DEVICE DRIVE MECHANISMS FOR SELECTABLE MEDIA TYPES

BACKGROUND

Media processing devices, such as label printers and the like, may be capable of accommodating more than one type of media. For instance, a given label printer may be capable of processing two-inch wide labels, or four-inch wide labels. However, such devices can generally accommodate only one media type at a time.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
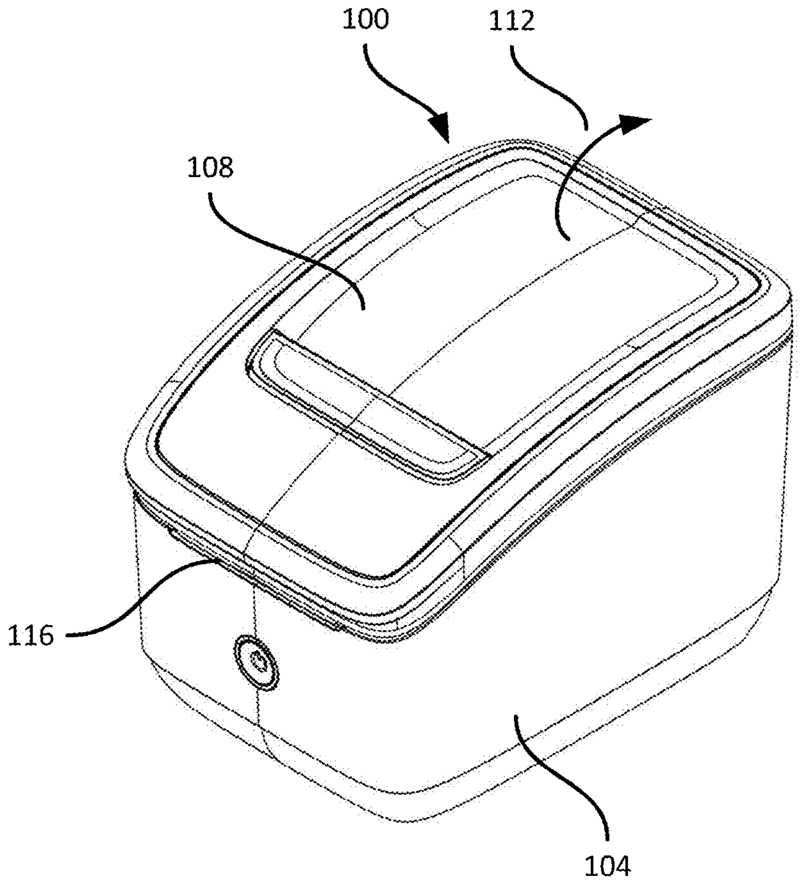
FIG. 1 is a diagram of a media processing device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a media processing device, comprising: a print head extending across a media path, the print head configured to apply indicia to media; a platen roller assembly adjacent to the print head and configured to draw the media from a media supply along the media path travelling between the print head and the platen roller assembly, the platen roller assembly including: (i) a first platen roller extending across a first portion of a width of the media path, and (ii) a second platen roller coaxial with the first platen roller, and extending across a second portion of the width of the media path; a drive assembly coupled with the first and second platen rollers, the drive assembly configured to selectively drive rotation of one or both of the first and second platen rollers.

Further examples disclosed herein are directed to a method at a controller of a media processing device, the method comprising: detecting a media type corresponding to a media supply installed in the media processing device; receiving a print command including a media type parameter; selecting, based on the detected media type and the media type parameter, a platen roller assembly configuration for a platen roller assembly configured to draw media from the media supply along a media path, the platen roller assembly including (i) a first platen roller extending across a first portion of a width of the media path, and (ii) a second platen roller coaxial with the first platen roller, and extending across a second portion of the width of the media path; and activating a drive assembly to selectively drive rotation of one or both of the first and second platen rollers, according to the selected platen roller assembly configuration.

FIG. 1 illustrates a media processing device 100, such as a label printer (also referred to herein simply as the printer 100). The printer 100 can be implemented as a tabletop label printer, as illustrated. The printer 100 can also be implemented in a wide variety of other form factors, including a portable printer, a desktop printer, and the like. The printer 100 includes various components configured to apply indicia to media such as discrete labels, a continuous paper strip, identity cards, or the like. The indicia can be applied, for example, by direct thermal printing, thermal transfer printing, or the like. In other examples, the media processing device 100 can include a radio frequency identification (RFID) assembly configured to write data to RFID tags embedded in labels or other media, in addition to or instead of applying indicia to the media.

The printer 100 includes a body 104 housing a media supply and other components, as well as a cover 108 configured to open (e.g., in a direction 112) to provide access to an interior of the printer 100. The printer 100 further includes an outlet 116, from which processed media (e.g., labels with indicia having been applied thereto within the body 104 of the printer 100) is dispensed.

A wide variety of media types are available for use in media processing devices such as the printer 100. For example, rolls or fan-feed boxes of labels are available in various different widths (the dimension perpendicular to the path the labels travel along through the printer 100), as well as different lengths (the dimension parallel to the path the labels travel along through the printer 100). Different media types may also have the same dimensions, but vary in other properties (e.g., labels including or omitting embedded RFID tags, labels with pre-printed graphics, particular coatings, and the like).

Further, various use cases for the printer 100 may involve printing associated information on two or more distinct media types. For example, the printer 100 may be deployed to print materials for access control to a facility (e.g., a cultural venue or the like), in which each patron is provided with a printed ticket (e.g., on a label two inches wide and four inches long) and a wrist band (e.g., a strip of material half an inch wide and six inches long). Providing both the ticket and the wrist band to each patron may involve operating two distinct printers, with attendant costs arising from the operation and maintenance of two separate devices.

The printer 100 includes certain components and functionality that allow the processing of two or more distinct types of media without the operation of additional printers. In other words, the printer 100 can accommodate more than one media type simultaneously, and includes a drive mechanism configurable to select between the media types installed in the printer 100.

Figure 2:
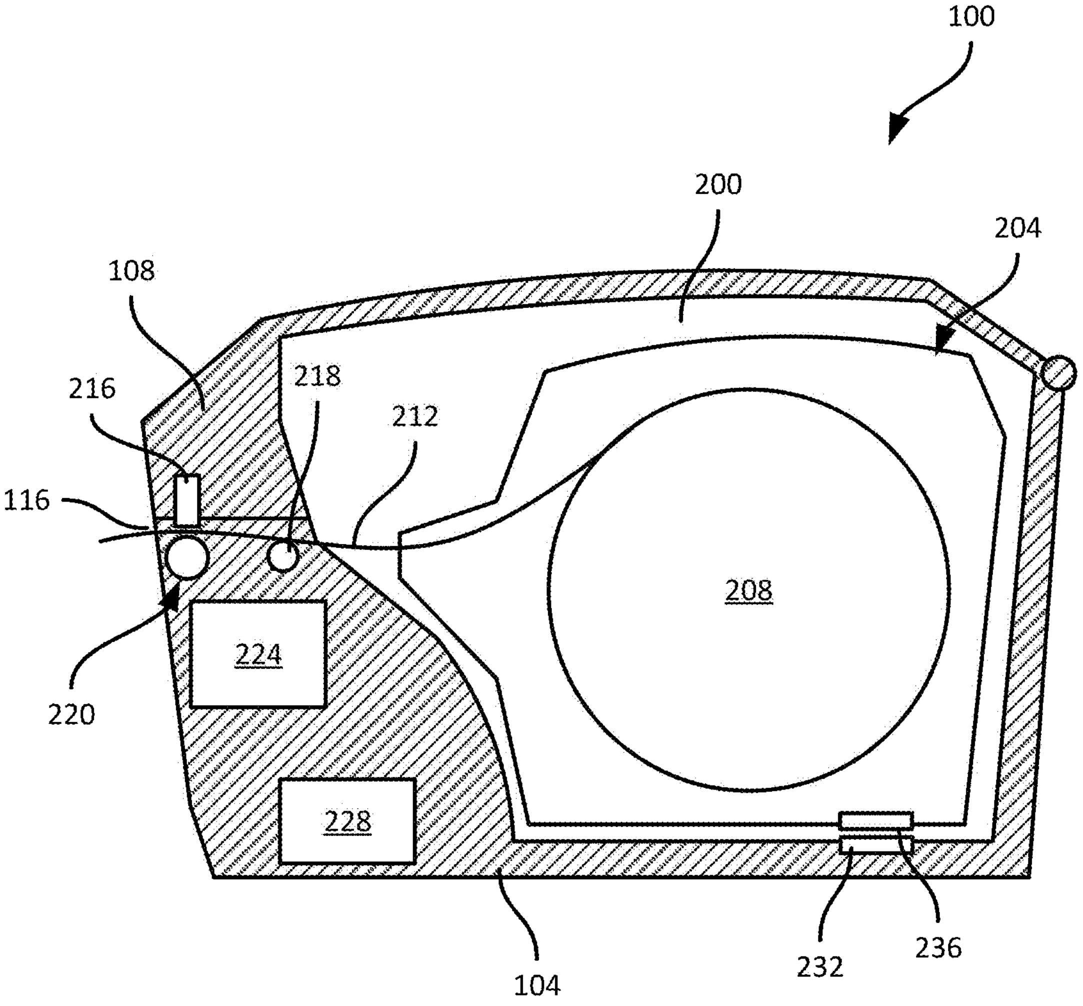
FIG. 2 is a simplified cross sectional view of the media processing device of FIG. 1.

Turning to FIG. 2, a simplified cross sectional view of the printer 100 is illustrated. As shown in FIG. 2, the body 104 and the cover 108 define a chamber 200 for receiving one or more media supplies, such as a media cartridge 204 (also referred to herein as a supply 204) containing a roll 208 of paper, labels, or the like. In other examples, the media supplies accommodated in the chamber 200 can include boxes of fan-feed labels, identity cards, or the like. In still other examples, the printer 100 can include an inlet in the body 104 for receiving media from an external supply, e.g., to travel through the chamber 200 for processing.

Media 212 from the supply 204 (e.g., from the roll 208, in the illustrated example) travels along a media path from the supply 204 to a nip formed by a print head 216 and a platen roller assembly 220. The media path can be defined by surfaces, rollers, and the like, such as a guide roller 218 (e.g., a passive, or non-driven, roller). At the nip, the print head applies indicia (e.g., via the application of heat to the media 212 as the media 212 traverses the nip, and the media 212 is then dispensed at the outlet 116. The platen roller assembly 220, as discussed below in greater detail, includes at least two distinct platen rollers, rather than a single platen roller. The platen rollers of the assembly 220 are driven (to draw the media 212 from the supply 204 to the nip) by a drive mechanism 224 contained in the body 104 of the printer 100. The drive mechanism 224 can be selectively operated, e.g., by a controller 228 of the printer 100, to drive either or both of the distinct platen rollers of the assembly 220. The selectable operating modes of the drive mechanism and the platen roller assembly 220 allow the printer 100 to process multiple distinct media types, either simultaneously or alternately. The controller 228 can be configured to select the appropriate drive mechanism configuration by detecting installed media types, e.g., via one or more sensors 232 disposed in the chamber 200 and configured to read media type data from identifier circuits affixed to the media supplies 204 installed in the printer 100.

Figure 3:
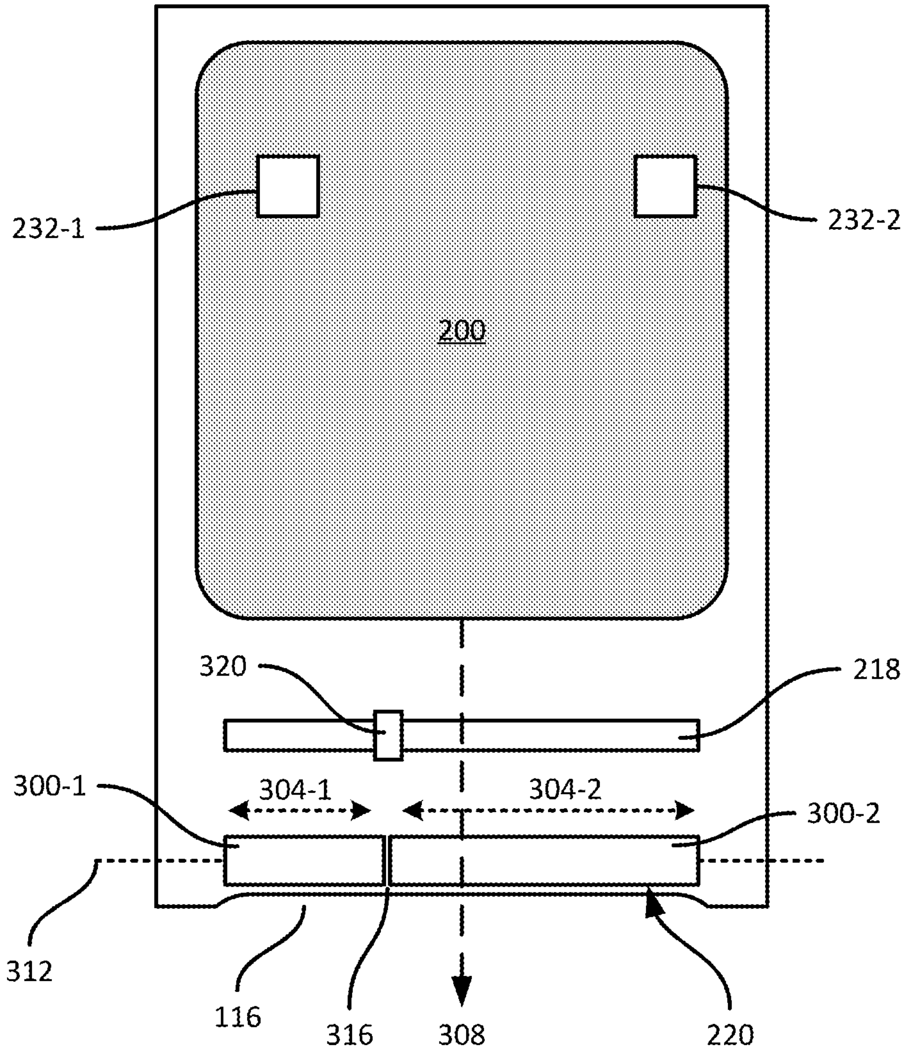
FIG. 3 is a top view of the media processing device of FIG. 2.

FIG. 3 illustrates a top view of the printer shown in FIG. 2, with the cover 108 and print head 216 omitted. As shown in FIG. 3, the platen roller assembly 220 includes a first platen roller 300-1, and a second platen roller 300-2. The first platen roller 300-1 extends across a first portion 304-1 of the width of the media path (which travels in a direction 308 from the media supply or supplies in the chamber 200, towards the outlet 116), and the second platen roller 300-2 extends across a second portion 304-2 of the width of the media path. The first and second platen rollers 300 are coaxial, both rotating about a common axis 312. In addition, the first and second platen rollers 300 are not in physical contact with one another (to allow independent rotation of the platen rollers 300), but a gap 316 between the platen rollers 300 is preferably small (e.g. less than 5 mm) to avoid inconsistent pressure on the media as the media traverses the nip.

As also seen in FIG. 3, the chamber 200 includes two distinct sensors 232-1 and 232-2, each configured to read data from respective circuits 236 affixed to cartridges 204 installed in the chamber 200. The split platen rollers of the assembly 220, along with the dual sensors 232, as well as the drive assembly discussed further below, enable the printer 100 to process distinct media types, either simultaneously or in alternate fashion. For example, the first platen roller 300-1 may be configured to drive media with widths of up to one inch, while the second platen roller 300-2 may be configured to drive media with widths of up to three inches. In other examples, the platen rollers 300 may can have equal widths, or unequal widths different than those mentioned above. The drive assembly is configurable to drive the platen roller assembly 220 in a plurality of configurations. For example, in a first configuration, the drive assembly can drive the first platen roller 300-1 in isolation (i.e., with the second platen roller 300-2 remaining stationary). In a second configuration, the drive assembly can drive the second platen roller 300-2 in isolation (i.e., with the first platen roller 300-1 remaining stationary). In a third configuration, the drive assembly can drive the first and second platen rollers 300 in synchronized rotation. The above configurations enable the printer 100 to print, for example, one inch-wide media via the first configuration, one, two, or three inch-wide media via the second configuration, and four inch-wide media via the third configuration.

The guide roller 218 is also shown in FIG. 3 as including a divider 320 disposed on the guide roller 218 and separating the first and second portions 304 of the width of the media path. The divider 320 can be, for example, an annular element with a greater radius than the radius of the remainder of the guide roller 218. The divider 320 may mitigate width-wise deviations of certain media, e.g., media having a width equal to or smaller than the widths of the portions 304. In other examples, the divider 320 can be omitted.

Figure 4A:
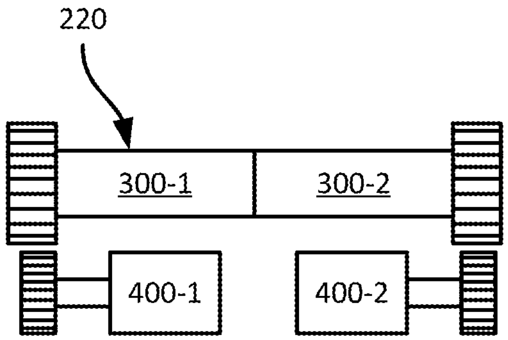
FIG. 4A is a diagram of an example drive assembly of the media processing device of FIG. 2.
Figure 4B:
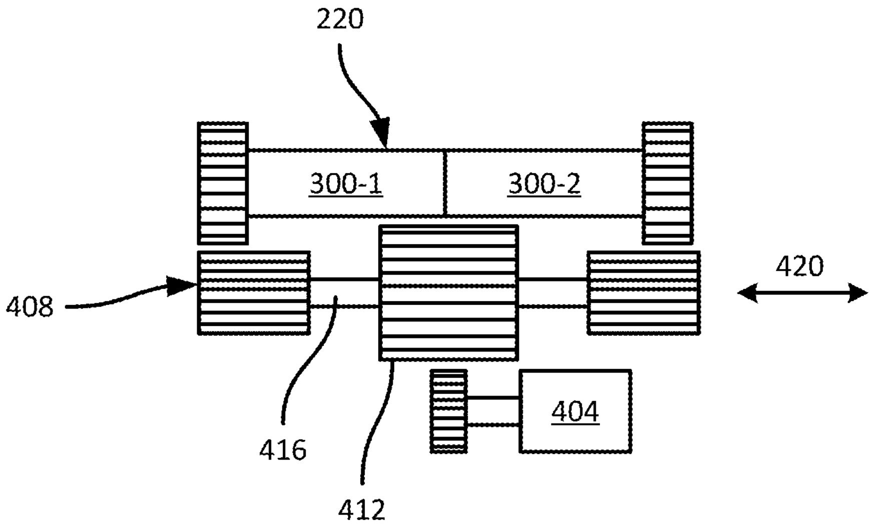
FIG. 4B is a diagram of another example drive assembly of the media processing device of FIG. 2.

Turning to FIGS. 4A and 4B, the drive assembly is shown in greater detail. In particular, the platen roller assembly 220 is shown from the front. FIG. 4A illustrates a first example drive mechanism including a first motor 400-1 coupled to the first platen roller 300-1 via a first gear train or other power transmission mechanism (e.g., a belt drive, or a combination of gears and belts, and/or other suitable components). The first motor 400-1 is decoupled from the second platen roller 300-2. The drive assembly also includes a second motor 400-2, coupled with the second platen roller 300-2 via another power transmission mechanism (e.g., another gear train), and decoupled from the first platen roller 300-1. The controller 228 can cause rotation of either or both of the platen rollers 300 by activating either or both of the motors 400.

FIG. 4B illustrates another example drive mechanism, including a single motor 404, coupled to a clutch mechanism 408. In this example, the clutch mechanism includes a central gear 412 configured to engage with an output of the motor 404, and respective gears (or other suitable power transmission components) at either end of a shaft 416, configured to engage with the platen rollers 300. The shaft 416 is movable in a width-wise direction 420, e.g., via a linear actuator activated by the controller 228. In a first position, the clutch mechanism 408 couples the motor 404 with the first platen roller 300-1 and decouples the motor 404 from the second platen roller 300-2. In a second position, the clutch mechanism 408 couples the motor 404 with the second platen roller 300-2 and decouples the motor 404 from the first platen roller 300-1. In a third position, shown in FIG. 3, the clutch mechanism couples the motor 404 with both the platen rollers 300.

Figure 5:
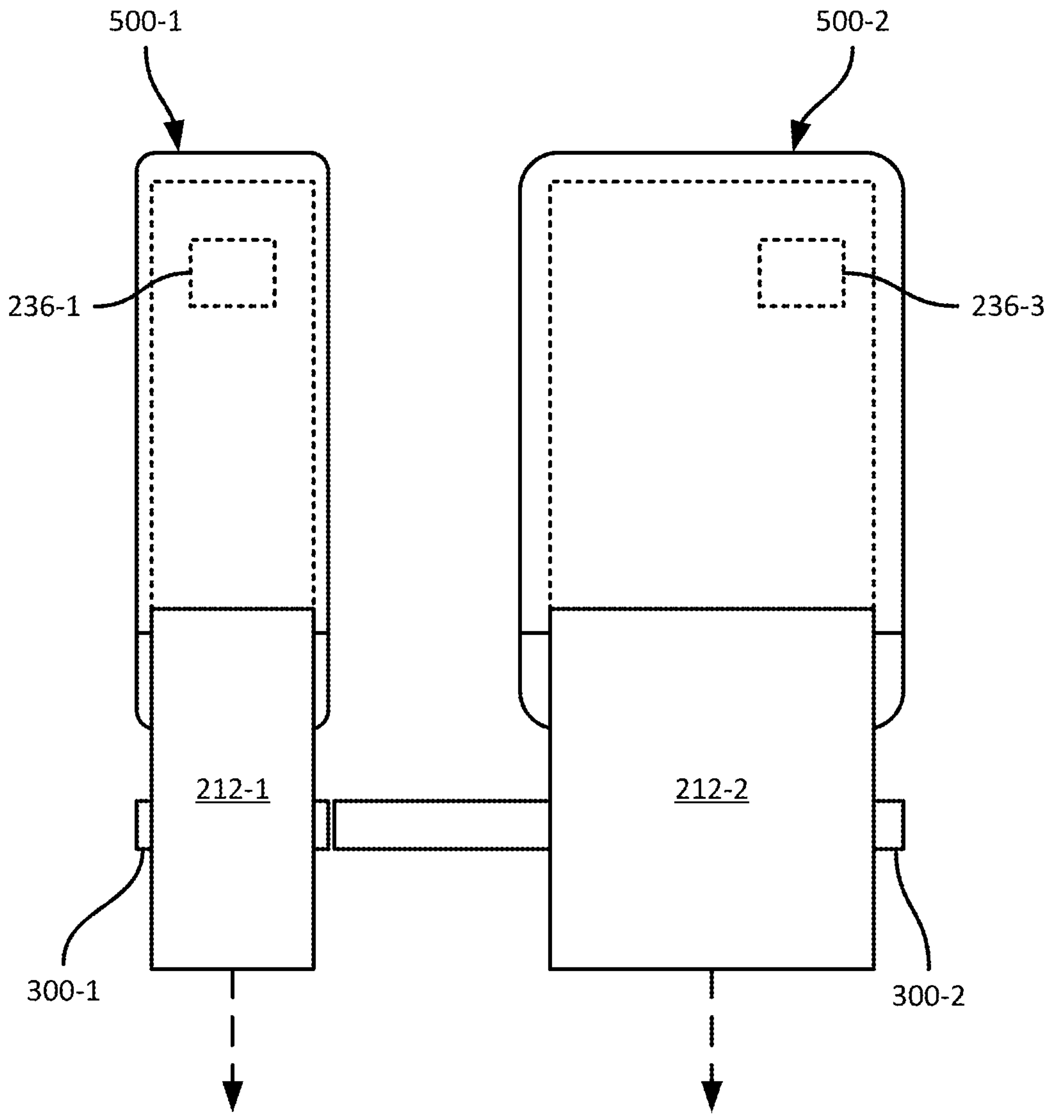
FIG. 5 is a diagram of a configuration of media supplies installed in the media processing device of FIG. 2.
Figure 6:
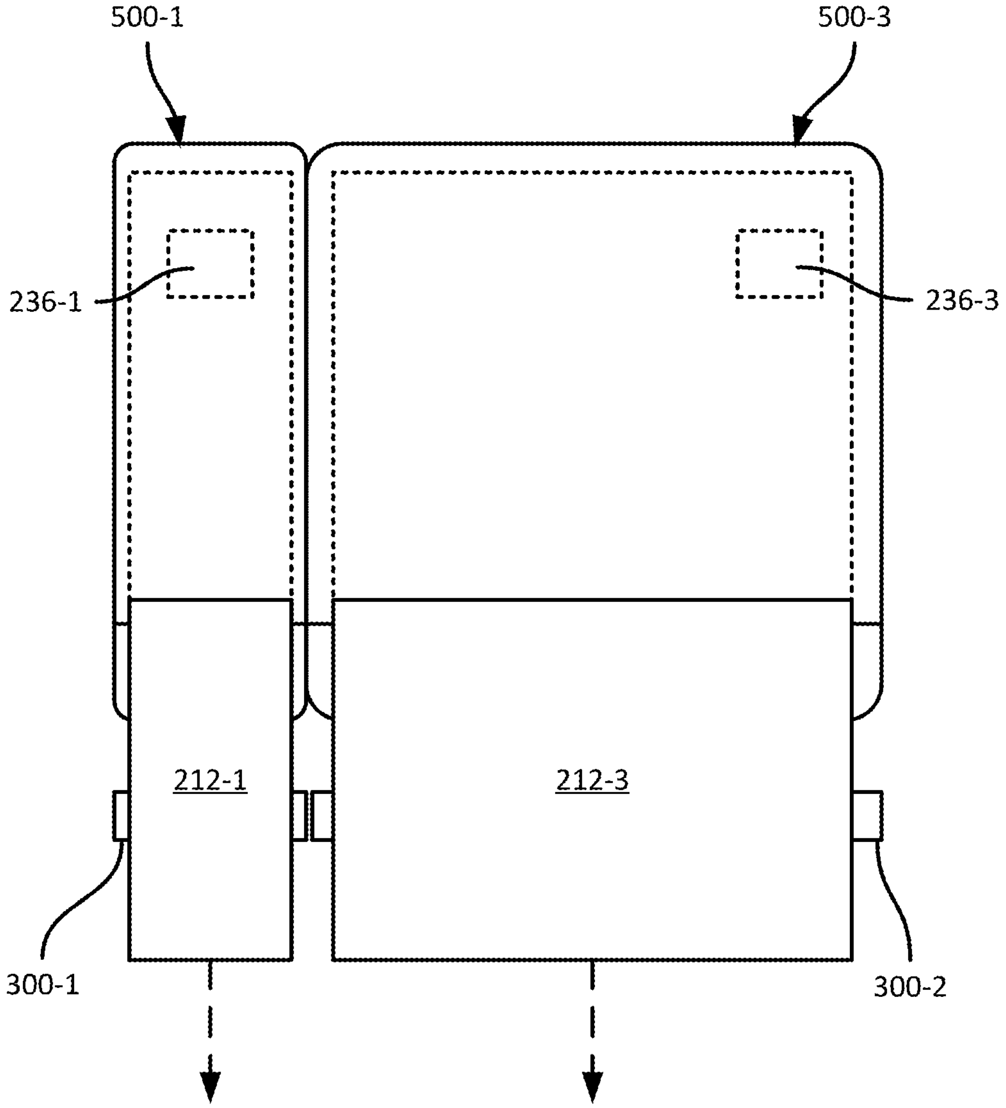
FIG. 6 is a diagram of another configuration of media supplies installed in the media processing device of FIG. 2.
Figure 7:
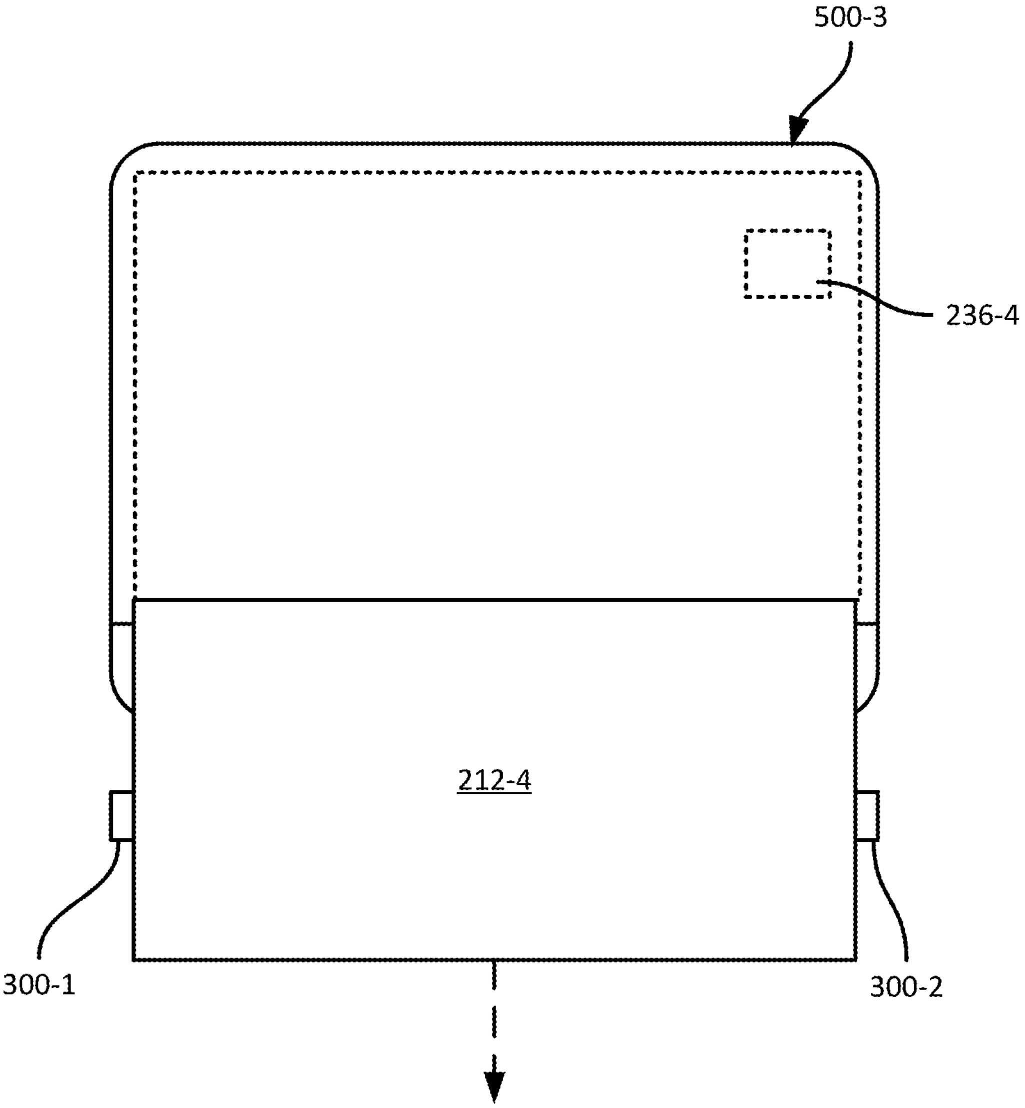
FIG. 7 is a diagram of a further configuration of media supplies installed in the media processing device of FIG. 2.

As will be apparent from the discussion herein, the printer 100 can simultaneously accommodate multiple media supplies, and operate the drive assembly for selectable ones of the media types installed in the printer 100. FIG. 5, FIG. 6, and FIG. 7 illustrate example configurations of media supplies that the printer 100 can accommodate. In other embodiments, the printer 100 can include more than two platen rollers 300, and can therefore accommodate additional media supplies. In further examples, the widths of the platen rollers 300 vary compared to those illustrated (e.g., the platen rollers 300 may have equal widths).

FIG. 5 illustrates an example in which a media supply 500-1 having a circuit 236-1, as well as a media supply 500-2 having a circuit 236-2, are installed in the chamber 200. The controller 228 can read respective media types from the circuits 236 via the sensors 232, and can then select the appropriate platen roller assembly configuration in response to receiving a print command specifying a given media type. For example, the controller 228 can detect that the supply 500-2 contains two inch-wide labels, and can activate the second platen roller 300-2 in response to a print job specifying two inch-wide labels. The controller 228 can, for example, maintain a predetermined association between each sensor 232 and a corresponding platen roller 300.

FIG. 6, illustrates another scenario with the supply 500-1 and a supply 500-3 (e.g., of three inch-wide labels 212-3) installed in the chamber 200 and having a circuit 236-3. FIG. 7 illustrates a further scenario with a single supply 500-4, e.g., of four inch-wide labels 212-4 and a circuit 236-4. The controller 228 can maintain, in addition to the associations between sensors 232 and platen rollers 300, maintain a media type-specific association between both platen rollers 300 and one sensor 232, enabling the controller 228 to detect when to drive both platen rollers 300 in synchronized rotation.

Figure 8:
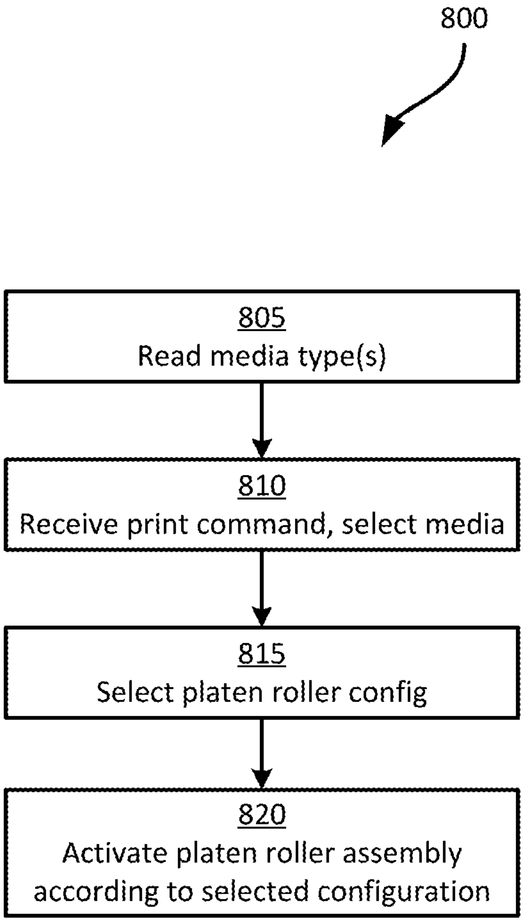
FIG. 8 is a flowchart of a method for selectably controlling a drive mechanism in a media processing device.

FIG. 8 illustrates a method 800 for selectably controlling a drive mechanism in a media processing device. The method 800 can be performed, for example, by the controller 228 of the printer 100, e.g., via the execution of firmware or other computer-readable instructions stored in a non-transitory computer readable medium (e.g., a memory chip integrated with or connected to the controller 228).

At block 805, e.g., in response to installation of one or more media supplies 204 in the chamber 200, the controller 228 can read media types, via the sensors 232, from the circuit(s) 236 of the installed media supplies 204. The data read by the sensors 232 can include any one of, or any suitable combination of, unique identifiers of the supplies 204, remaining capacity (e.g., number of labels) of the supplies 204, and attributes of the supplies, such as a media width.

Via block 805, in other words, the controller 228 discovers what media is installed in the chamber 200. The information discovered at block 805 can subsequently be used to select platen roller assembly configurations based on received print jobs, and to control the drive assembly according to the selected platen roller assembly configurations.

At block 810, the controller 228 is configured to receive a print command, also referred to as a print job. The print command can contain an image to be printed on a label or other media, and/or data to be written to an RFID tag embedded in a label or other media. The print command also contains a media type parameter and/or media attributes, such as a media width, enabling the controller 228 to select which supply 204 detected at block 805 is to be used to execute the print command. For example, when the controller 228, at block 805, detects a supply 204 of 1-inch wide media via the sensor 232-1, and a supply 204 of 2-inch wide media via the sensor 232-2, and a print command is received specifying the use of 2-inch wide media, the controller 228 selects the second supply 204 mentioned above, detected via the sensor 232-1.

At block 815, the controller 228 is configured to select a platen roller assembly configuration, based on the media types detected at block 805 and the print command received at block 810. The controller 228 can maintain, for example, in memory, a mapping of media types and positions within the chamber 200 to platen roller assembly configurations. For example, the mapping can specify that 1-inch wide media detected by the sensor 232-1 corresponds to a configuration in which the platen roller 300-1 is driven in isolation, while 4-inch wide media detected by the sensor 232-1 corresponds to a configuration in which the platen rollers 300-1 and 300-2 are driven synchronously. The mapping can further specify that any media type detected via the sensor 232-2 corresponds to a configuration in which the platen roller 300-2 is driven in isolation. At block 815, therefore, the controller 228 determines which sensor 232 detected the media type specified in the print command, and selects the corresponding platen roller assembly configuration from the above mapping.

At block 820, the controller 228 is configured to activate the platen roller assembly 220 according to the configuration selected at block 815. For example, the controller 228 can select between isolated rotation of the first platen roller 300-1, isolated rotation of the second platen roller 300-2, and synchronized rotation of the first and second platen rollers 300-1 and 300-2.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A media processing device, comprising:
- a print head extending across a media path, the print head configured to apply indicia to media;
- a platen roller assembly adjacent to the print head and configured to draw the media from a media supply along the media path travelling between the print head and the platen roller assembly, the platen roller assembly including:
  - (i) a first platen roller extending across a first portion of a width of the media path, and
  - (ii) a second platen roller coaxial with the first platen roller, and extending across a second portion of the width of the media path;
- a drive assembly coupled with the first and second platen rollers, the drive assembly configured to selectively drive rotation of one or both of the first and second platen rollers; and
- a controller configured to obtain a platen roller assembly configuration, and to control the drive assembly according to the platen roller assembly configuration,
- wherein the platen roller assembly configuration is selected from:
- (i) isolated rotation of the first platen roller,
- (ii) isolated rotation of the second platen roller, and
- (iii) synchronized rotation of the first and second platen rollers.

2. The media processing device of claim 1, further comprising:
- a chamber to receive one or more media supplies;
- a first sensor and a second sensor disposed in the chamber, to engage with identifier circuits of the one or more media supplies.

3. The media processing device of claim 2, wherein the controller is further configured to:
- read a first media type from an identifier circuit engaged with the first sensor; and
- select isolated rotation of the first platen roller in response to a print command containing the first media type.

4. The media processing device of claim 2, wherein the controller is further configured to:
- read a second media type from an identifier circuit engaged with the second sensor; and
- select isolated rotation of the second platen roller in response to a print command containing the second media type.

5. The media processing device of claim 2, wherein the controller is further configured to:
- read a third media type from an identifier circuit engaged with the second sensor; and
- select synchronized rotation of the first and second platen rollers in response to a print command containing the third media type.

6. The media processing device of claim 1, further comprising:
- a guide roller between the platen roller assembly and the media supply; and
- a divider disposed on the guide roller and separating the first and second portions of the width of the media path.

7. A media processing device, comprising:
- a print head extending across a media path, the print head configured to apply indicia to media;
- a platen roller assembly adjacent to the print head and configured to draw the media from a media supply along the media path travelling between the print head and the platen roller assembly, the platen roller assembly including:
  - (i) a first platen roller extending across a first portion of a width of the media path, and
  - (ii) a second platen roller coaxial with the first platen roller, and extending across a second portion of the width of the media path; and
- a drive assembly coupled with the first and second platen rollers, the drive assembly configured to selectively drive rotation of one or both of the first and second platen rollers, wherein the drive assembly includes:
a first motor coupled with the first platen roller and decoupled from the second platen roller; and
a second motor coupled with the second platen roller and decoupled from the first platen roller;
wherein the media processing device includes a controller configured to selectively activate either or both of the first and second motors.

8. The media processing device of claim 7, wherein the controller is configured to activate the first and second motors simultaneously at a common speed.

9. The media processing device of claim 7, wherein the controller is configured to obtain a platen roller assembly configuration, and to control at least one of the first motor or the second motor according to the platen roller assembly configuration, wherein the platen roller assembly configuration is selected from:
(i) isolated rotation of the first platen roller,
(ii) isolated rotation of the second platen roller, and
(iii) synchronized rotation of the first and second platen rollers.

10. The media processing device of claim 9, further comprising:
a chamber to receive one or more media supplies;
a sensor disposed in the chamber, to engage with identifier circuits of the one or more media supplies,
wherein the controller is further configured to:
read a media type from an identifier circuit engaged with the sensor; and
select isolated rotation of the first platen roller or the second platen roller in response to a print command containing the media type.

11. The media processing device of claim 9, further comprising:
a chamber to receive one or more media supplies;
a sensor disposed in the chamber, to engage with identifier circuits of the one or more media supplies,
wherein the controller is further configured to:
read a media type from an identifier circuit engaged with the sensor; and
select synchronized rotation of the first and second platen rollers in response to a print command containing the media type.

12. A media processing device, comprising:
a print head extending across a media path, the print head configured to apply indicia to media;
a platen roller assembly adjacent to the print head and configured to draw the media from a media supply along the media path travelling between the print head and the platen roller assembly, the platen roller assembly including:
(i) a first platen roller extending across a first portion of a width of the media path, and
(ii) a second platen roller coaxial with the first platen roller, and extending across a second portion of the width of the media path; and
a drive assembly coupled with the first and second platen rollers, the drive assembly configured to selectively drive rotation of one or both of the first and second platen rollers,
wherein the drive assembly includes:
a motor; and
a clutch mechanism selectively coupling the motor to (i) the first platen roller in isolation, (ii) the second platen roller in isolation, and (iii) the first and second platen rollers.

13. The media processing device of claim 12, wherein the media processing device includes a controller configured to selectively configure the clutch mechanism according to a media type.

14. The media processing device of claim 12, wherein the controller is configured to obtain a platen roller assembly configuration, and to control the clutch according to the platen roller assembly configuration, wherein the platen roller assembly configuration is selected from:
(i) isolated rotation of the first platen roller,
(ii) isolated rotation of the second platen roller, and
(iii) synchronized rotation of the first and second platen rollers.

15. The media processing device of claim 14, further comprising:
a chamber to receive one or more media supplies;
a sensor disposed in the chamber, to engage with identifier circuits of the one or more media supplies,
wherein the controller is further configured to:
read a media type from an identifier circuit engaged with the sensor; and
select isolated rotation of the first platen roller or the second platen roller in response to a print command containing the media type.

16. The media processing device of claim 14, further comprising:
a chamber to receive one or more media supplies;
a sensor disposed in the chamber, to engage with identifier circuits of the one or more media supplies,
wherein the controller is further configured to:
read a media type from an identifier circuit engaged with the sensor; and
select synchronized rotation of the first and second platen rollers in response to a print command containing the media type.

17. A method at a controller of a media processing device, the method comprising:
detecting a media type corresponding to a media supply installed in the media processing device;
receiving a print command including a media type parameter;
selecting, based on the detected media type and the media type parameter, a platen roller assembly configuration for a platen roller assembly configured to draw media from the media supply along a media path, the platen roller assembly including (i) a first platen roller extending across a first portion of a width of the media path, and (ii) a second platen roller coaxial with the first platen roller, and extending across a second portion of the width of the media path; and
activating a drive assembly to selectively drive rotation of one or both of the first and second platen rollers, according to the selected platen roller assembly configuration.

18. The method of claim 17, wherein detecting the media type includes reading the media type from one of a first sensor and a second sensor disposed in a media supply chamber of the media processing device.

19. The method of claim 18, wherein the print command includes a first media type, and wherein selecting the platen roller assembly configuration includes:
responsive to detecting the first media type via the first sensor, selecting isolated rotation of the first platen roller.

20. The method of claim 18, wherein the print command includes a second media type, and wherein selecting the platen roller assembly configuration includes:

responsive to detecting the second media type via the second sensor, selecting isolated rotation of the second platen roller.

21. The method of claim 18, wherein the print command includes a third media type, and wherein selecting the platen roller assembly configuration includes:

responsive to detecting the third media type via the first sensor, selecting synchronized rotation of the first and second platen rollers.

22. The method of claim 17, wherein activating the drive assembly includes activating one or both of a first motor coupled to the first platen roller, and a second motor coupled to the second platen roller.

23. The method of claim 17, wherein activating the drive assembly includes:

controlling a clutch mechanism to engage a motor with one or both of the first and second platen rollers; and activating the motor.

* * * * *